United States Patent
Harizopoulos et al.

(10) Patent No.: US 10,318,346 B1
(45) Date of Patent: Jun. 11, 2019

(54) PRIORITIZED SCHEDULING OF DATA STORE ACCESS REQUESTS

(71) Applicant: Amazon Technologies, Inc., Seattle, WA (US)

(72) Inventors: Stavros Harizopoulos, San Francisco, CA (US); Michail Petropoulos, San Francisco, CA (US); Andrea Olgiati, Gilroy, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/274,813

(22) Filed: Sep. 23, 2016

(51) Int. Cl.
| G06F 12/12 | (2016.01) |
| G06F 9/48 | (2006.01) |
| G06F 13/16 | (2006.01) |
| G06F 3/06 | (2006.01) |

(52) U.S. Cl.
CPC .......... *G06F 9/4881* (2013.01); *G06F 3/061* (2013.01); *G06F 3/067* (2013.01); *G06F 3/0622* (2013.01); *G06F 3/0653* (2013.01); *G06F 13/1642* (2013.01)

(58) Field of Classification Search
CPC ............................ G06F 9/4881; G06F 3/0622
USPC ....................................................... 711/158
See application file for complete search history.

(56) References Cited

U.S. PATENT DOCUMENTS

| 6,769,017 | B1 * | 7/2004 | Bhat | G06F 9/5033 709/214 |
| 2002/0053006 | A1 * | 5/2002 | Kawamoto | G06F 12/121 711/128 |
| 2009/0254774 | A1 | 10/2009 | Chamdani et al. | |
| 2010/0082603 | A1 | 4/2010 | Krompass et al. | |
| 2011/0153662 | A1 | 6/2011 | Stanfill et al. | |

* cited by examiner

*Primary Examiner* — Jae U Yu
(74) *Attorney, Agent, or Firm* — Robert C. Kowert; Meyertons, Hood, Kivlin, Kowert & Goetzel, P.C.

(57) ABSTRACT

Data stores may implement prioritized scheduling of data store access requests. When new access requests are received, the new access requests may be scheduled for prioritized execution on processing resources. Access requests that are currently being executed with prioritized execution may be reprioritized to make additional capacity for prioritized execution of the new access requests. Prioritized execution may be automatically enabled or disabled for a data store based on monitoring of performance metrics for executing access requests.

20 Claims, 8 Drawing Sheets

PRIORITIZED SCHEDULING OF DATA STORE ACCESS REQUESTS

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data processing.

For example, data processing is often measured by the speed at which requests to access data are performed. Some types of data access requests require intensive computational and storage access workloads, while other types of data access requests may only involve small amounts of work to process. As data stores may have to process both high and low workload access requests, scheduling techniques to perform the different types of access requests may be implemented so that access request processing is optimally performed.

Figure 1A:
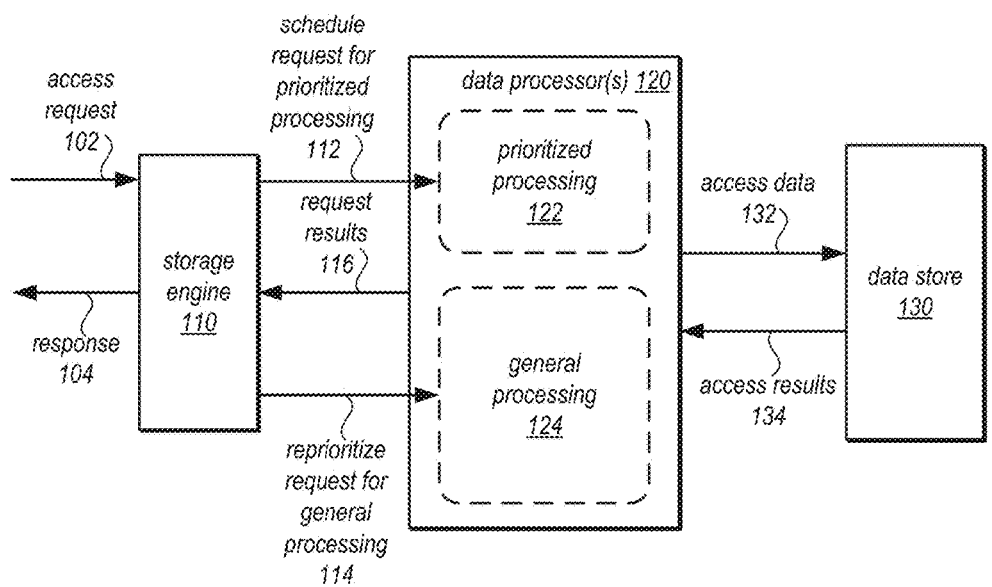
FIG. 1A illustrates a logical block diagram of prioritized scheduling of data store access requests, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of prioritized scheduling of data store access requests are described herein. Data access requests, such as queries for data that satisfies various conditions or criteria, insertions, deletions, modifications, or any other request triggering processing based on a request to access a data store may utilize various processing resources, including various central processing units (CPUs), graphical processing units (GPUs), or other processing components that may execute various tasks to process access requests. Because data access requests may vary in terms of the workload placed upon the processing resources to execute the access request, scheduling techniques may be implemented to distribute processing resources amongst multiple or concurrent access requests that may be processed at the same time or overlapping times. Therefore, a scheduling technique may be implemented to balance utilization of the processing resources amongst multiple access requests.

Scheduling techniques may be implemented to optimize processing in different ways. For instance, some scheduling techniques are implemented for simplicity and/or to ensure that no task is starved (e.g., unable to receive time to utilize processing resources, such as a First In First Out (FIFO) scheduling algorithm). Some scheduling techniques may be implemented to improve the average performance of tasks overall, such as a round-robin scheduling technique (which ensures that each task receives a portion of time to utilize processing resources, cycling through ongoing tasks). In situations where the amount of time or work to execute tasks varies, some scheduling techniques may take known information about tasks to better schedule tasks with low workloads (e.g., short running tasks) with high workloads (e.g., long running tasks). Shortest remaining time first (SRTF), which may also be known as shortest remaining time to process (SRTP), selects the task with a shortest amount of time remaining to complete utilizing processing resources so that low workload tasks complete quickly while high workload tasks complete more slowly. Techniques such as SRTF, however, rely upon information that is known about the task. In order to schedule tasks of unknown duration without such information, prioritized scheduling may be implemented as discussed below in various embodiments.

FIG. 1A illustrates a logical block diagram of prioritized scheduling of data store access requests, according to some embodiments. Data store 130 may provide data storage for various types of data storage including storage for structured data (e.g., relational database tables) or semi-structured data (e.g., non-relational database tables), object data stores (e.g., key-value stores), files systems, or any other data storage that is made accessible via access request. In order to perform one or multiple tasks to service an access request, one or more data processor(s) 120 (e.g., CPUs, GPUs, or other processing components, such as dedicated processing circuitry implemented in field programmable gate arrays (FPGAs) or application specific integrated circuits (ASICs)) may execute various process(es) associated with an access request. For example, data processor(s) 120 may execute various Input/Output (I/O) requests to obtain data from a storage device in order to compare the obtained data with a predicate for a query (e.g., where USERNAME="John"). Storage engine 110 may be implemented in various embodiments, to implement prioritized scheduling for access requests as they are received.

For example, as illustrated in FIG. 1A, an access request, request 102, may be received at storage engine 110. Storage engine 110 may apply prioritized scheduling for the received request according to a prioritized scheduling scheme that schedules a received request for prioritized processing. Because previously received requests may be already scheduled for and being executed with prioritized processing, storage engine 110 may reprioritize or modify the scheduling of processes for currently executing access requests to make additional capacity available for executing the new access request 102 with prioritized processing. For instance, data processor(s) 120 may implement prioritized processing 122 and general processing 124 for executing processes to perform access requests. Prioritized processing 122 may be implemented by assigning higher priority (e.g., using priority values as discussed below with regard to FIG. 5A) in order to provide prioritized access requests with more time to utilize data processor(s) 120 to execute tasks than access requests being executed as part of general processing 124. Alternatively, as discussed below with regard to FIG. 5B, data processor(s) 120 may divided into prioritized processors and general processors (e.g., processing cores in a CPU dedicated to executing processes for prioritized access requests and processing cores dedicated to executing processes for general processing) so that an affinity scheduling technique may be implemented to prioritize access requests.

Figure 1B:
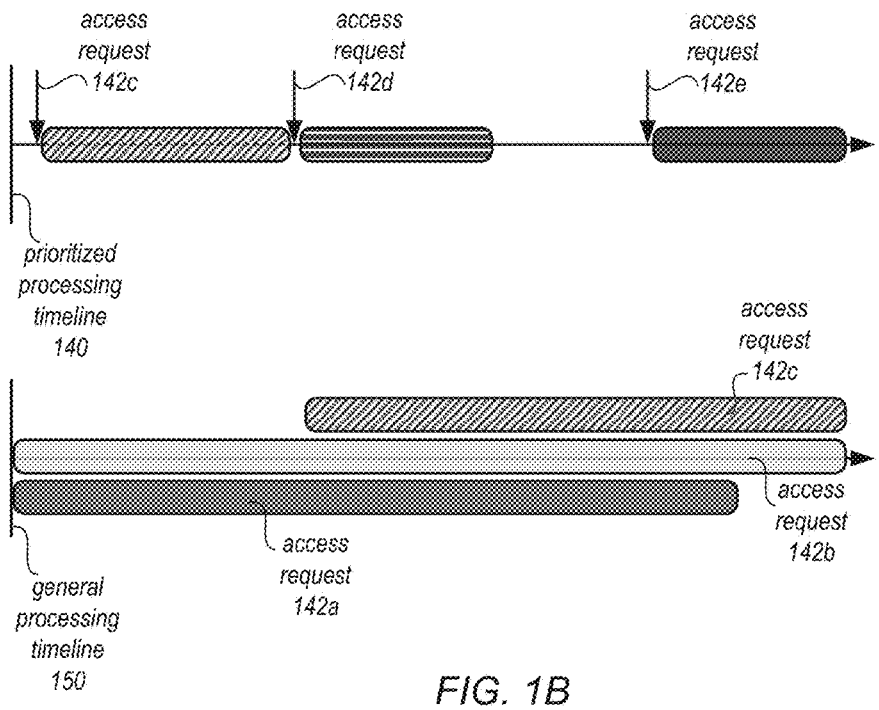
FIG. 1B illustrates respective timelines for prioritized and general processing of access requests, according to some embodiments.

FIG. 1B illustrates respective timelines for prioritized and general processing of access requests, according to some embodiments. As noted above, when a new access request is received, then the new access request may be scheduled and performed with prioritized processing. For instance, access request 142 is received at the point indicated in prioritized processing timeline 140 and is scheduled and performed with prioritized processing until access request 142d is received after which access request 142c is reprioritized for general processing, as indicated in general processing timeline 150. In some embodiments, prioritized processing capacity may be limited to one access request at a time may be scheduled for prioritized processing. However, in other embodiments, capacity for multiple prioritized access requests may be implemented. In such cases, the number of slots or available prioritized processing capacity may be managed like a FIFO queue (so that when a new access request is enqueued, another access request is dequeued and reprioritized for general processing). Sometimes, access requests, such as access request 142 may complete execution before another access request, such as access request 142e, is received. In this way, short running or low workload access requests may be quickly performed. Another access request that is currently executing as part of general processing may be promoted or returned to prioritized processing, such as access request 142a. In at least some embodiments, an order in which access requests are received for processing may be maintained so that a request may be identified for promotion or returned to prioritized processing. If, for example, request 142a were to have completed when prioritized processing capacity became available, then the ordering may indicate that access request 142b should be promoted. In this way, access requests that are possibly a short running request are more likely to be returned to prioritized processing because they are returned before older access requests.

General processing 124 may implement a balanced scheduling technique (e.g., a round robin so that each access request being executed as part of general processing may receive some processing time at data processor(s) 120. For example, the time slice or time quantum for each access request in general processing 124 may be the same.

Once storage engine 110 has scheduled the request for prioritized processing 112 (e.g., scheduling, instructing, or otherwise assigning the new access request 102 for prioritized processing) and requesting a reprioritization 113 of a currently executing access request from prioritized processing 122 to general processing 124, then data processors 120 may perform various a requests to access data 132 with respect to data store 130 (e.g., write to data or read data from data store 130) and receive access results 134 (e.g., an acknowledgement of an operation, such as a write, or retrieved data). Data processor(s) 120 may then provide results 116 to storage engine 110, which in turn may provide a response 104 (e.g., query results or request acknowledgement indicating success or failure).

Please note that the previous description of a storage engine, data processors, data store, and prioritized processing is a logical description and thus is not to be construed as limiting as to the implementation of a data processor, a data store, storage engine, or portions thereof. For example, data processor(s) 120 may be implemented as a cluster or group of nodes that perform data processing, such as discussed below with regard to FIGS. 3-4.

This specification begins with a general description of a data storage service that implements data processing and/or storage services that provide prioritized scheduling for data store access requests. Then various examples of the data storage service, including different components/modules, or arrangements of components/module that may be employed as part of implementing the data storage service are discussed. A number of different methods and techniques to implement prioritized scheduling for data store access requests are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
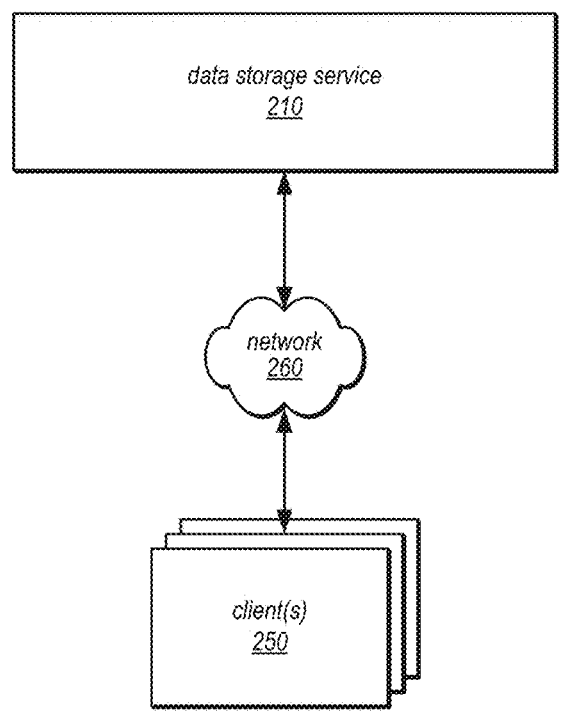
FIG. 2 is a block diagram illustrating a network-based data storage service, according to some embodiments.

FIG. 2 is a block diagram illustrating a network-based data storage service, according to some embodiments. Data storage service 210 may include various types of database storage services (both relational and non-relational) for storing, querying, and updating data. Such services may be enterprise-class database systems that are highly scalable and extensible. Queries may be directed to a database in data storage service 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, data storage service 210 may implement, in some embodiments, a data warehouse service, such as discussed below with regard to FIGS. 3-4.

Data storage service 210 may also implement other types of data stores (in addition to or instead of a database system) for storing, accessing, and managing data on behalf of clients 250 as a network-based service that enables clients 250 to operate a data storage system in a cloud or network computing environment. Data storage service 210 may also include various kinds of object or file data stores for putting, updating, and getting data objects or files. As with database service examples given above, such data storage services 210 may be accessed via programmatic interfaces (e.g., APIs) or graphical user interfaces. Data storage service 210 may also be implemented as a virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In at least some embodiments, data storage service 210 may be a network-based service implemented as part of a provider network. A provider network may be a private or closed system or may be set up by an entity such as a company or a public sector organization to provide one or more services (such as various types of cloud-based storage) accessible via the Internet and/or other networks to clients 250. A provider network may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and storage services offered by the provider network. In some embodiments, a provider network may implement various computing resources or services, such as a virtual compute service, along with data storage service 210, and/or any other type of network based services (which may include various other types of storage, processing, analysis, communication, event handling, visualization, and security services not illustrated).

Generally speaking, clients 250 may encompass any type of client configurable to submit network-based requests to provider network 200 via network 260, including access requests for storage services (e.g., a request to create, read, write, obtain, or modify data in data storage service(s) 210, etc.). For example, a given client 250 may include a suitable version of a web browser, or may include a plug-in module or other type of code module configured to execute as an extension to or within an execution environment provided by a web browser. Alternatively, a client 250 may encompass an application such as a database application (or user interface thereof), a media application, an office application or any other application that may make use of storage resources in data storage service(s) 230 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with provider network 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 may be configured to provide access to provider network 200 to other applications in a manner that is transparent to those applications. For example, client 250 may be configured to integrate with an operating system or file system to provide storage on data storage service) 210 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service 210 may be coordinated by client 250 and the operating system or file system on behalf of applications executing within the operating system environment.

Clients 250 may convey network-based services requests (e.g., access requests to read or write data may be directed to data in data storage service 210 and receive responses from data storage service 210 via network 260. In various embodiments, network 260 may encompass any suitable combination of networking hardware and protocols necessary to establish network-based-based communications between clients 250 and data storage service 210. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and data storage service 210 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and data storage service 210. It is noted that in some embodiments, clients 250 may communicate with data storage service 210 using a private network rather than the public Internet.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below. In various embodiments, the functionality of a given system or service component (e.g., a component of data storage service 210) may be implemented by a particular node or may be distributed across several nodes. In some embodiments, a given node may implement the functionality of more than one service system component (e.g., more than one data store component).

Figure 3:
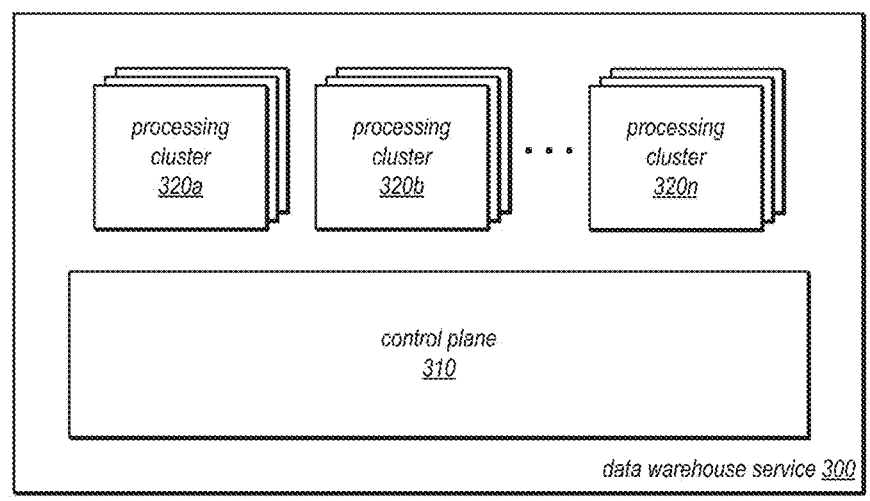
FIG. 3 is a block diagram of a data warehouse service that implements prioritized scheduling, according to some embodiments.

In at least some embodiments, data storage service 210 may be a data warehouse service. FIG. 3 is a block diagram of a data warehouse service that implements prioritized scheduling, according to some embodiments. A data warehouse service as discussed below may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as related to storing data in a columnar data format may be equally configured or adapted to implement embodiments for various other types of relational database systems, such as row-oriented database systems, or non-relational database systems. Therefore, the following examples are not intended to be limiting as to various other types or formats of database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data). For example, for database operations that only need to access and/or operate on one or a small number of columns at a time, less memory space may be required than with traditional row-based storage, since only data blocks storing data in the particular columns that are actually needed to execute a query may be retrieved and stored in memory. To increase the efficiency of implementing a columnar relational database table, a sort order may be generated and applied so that entries in the database table are stored according to the sort order. When queries are received, mapping information, such as may be maintained in a superblock as or other collection of metadata for processing queries may be utilized to locate the data values likely stored in data blocks of the columnar relational database table, which may be used to determine data blocks that do not need to be read when responding to a query.

Data warehouse service 300 may be implemented by a large collection of computing devices, such as customized or off-the-shelf computing systems, servers, or any other combination of computing systems or devices, such as the various types of systems 1000 described below with regard to FIG. 8. Different subsets of these computing devices may be controlled by control plane 310. Control plane 310, for example, may provide a cluster control interface to clients or users who wish to interact with the processing clusters 320 managed by control plane 310. For example, control plane 310 may generate one or more graphical user interfaces (GUIs) for storage clients, which may then be utilized to select various control functions offered by the control interface for the processing clusters 320 hosted in the data warehouse service 300.

As discussed above, various clients (or customers, organizations, entities, or users) may wish to store and manage data using a data management service. Processing clusters, such as those discussed below with regard to FIG. 4 may respond to various access requests, including store requests (e.g., to write data into storage) or queries for data (e.g., such as a Structured Query Language request (SQL) for particular data), along with many other data management or storage services. Multiple users or clients may access a processing cluster to obtain data warehouse services. Therefore, concurrent access requests may be processed by a processing cluster 320 that implements prioritized processing between access requests submitted by one or multiple different clients. In at least some embodiments, a data warehouse service may provide network endpoints to the clusters which allow the clients to send requests and other messages directly to a particular cluster. Network endpoints, for example may be a particular network address, such as a URL, which points to a particular cluster. For instance, a client may be given the network endpoint "http://mycluster.com" to send various request messages to. Multiple clients (or users of a particular client) may be given a network endpoint for a particular cluster. Various security features may be implemented to prevent unauthorized users from accessing the clusters. Conversely, a client may be given network endpoints for multiple clusters.

Processing clusters, such as processing clusters 320a, 320b, through 320n, hosted by the data warehouse service 300 may provide an enterprise-class database query and management system that allows users to send data processing requests to be executed by the clusters 320, such as by sending a data processing request to a cluster control interface implemented by the network-based service. Scaling clusters 320 may allow users of the network-based service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently.

Figure 4:
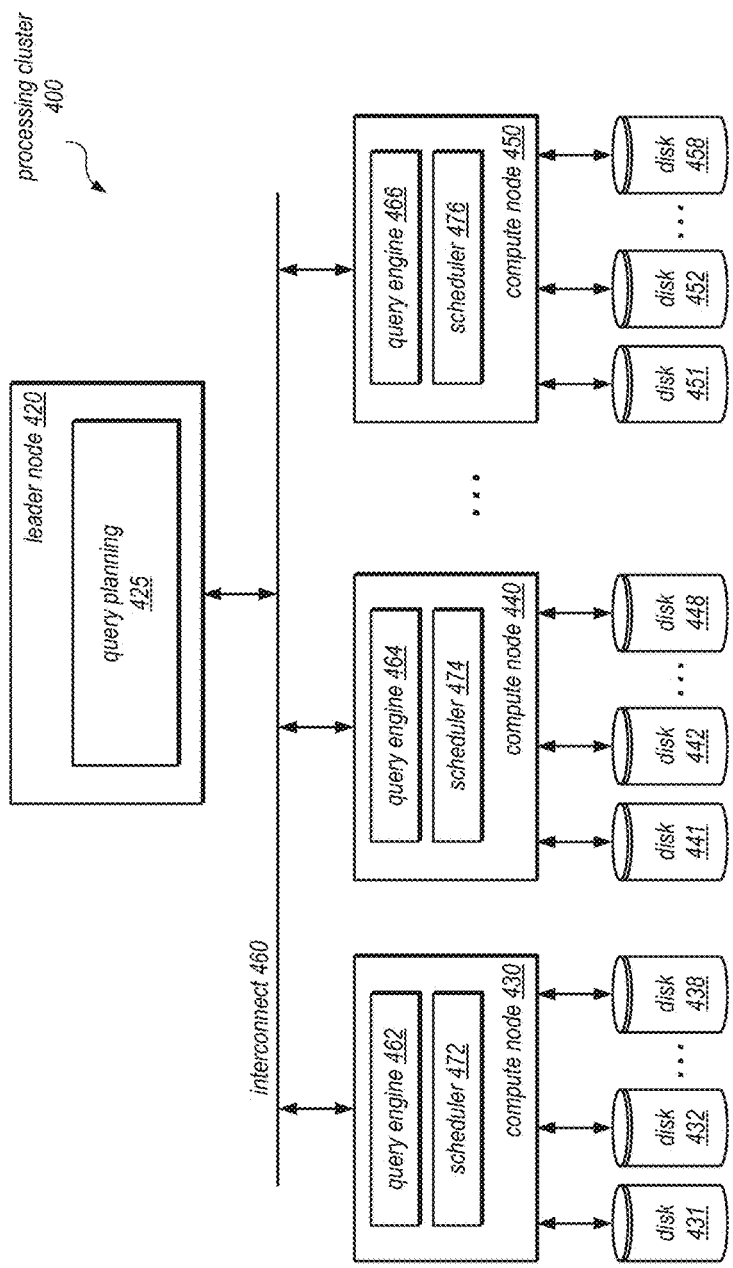
FIG. 4 is a block diagram illustrating an example processing cluster for a data warehouse service, according to some embodiments.

FIG. 4 is a block diagram illustrating an example processing cluster for a data warehouse service, according to some embodiments. As illustrated in this example, a processing cluster 400 may include a leader node 420 and compute nodes 430, 440, and 450, which may communicate with each other over an interconnect 460. Leader node 420 may generate query plan(s) for executing queries on processing cluster 400. As described herein, each node in a processing cluster may include multiple disks on which storage slabs of a table may be stored on behalf of clients (e.g., users, client applications, and/or storage service subscribers). In this example, compute node 430 includes disks 431-438, compute node 440 includes disks 441-448, and compute node 450 includes disks 451-458. In some embodiments, a component of the processing cluster (or the data warehouse system of which it is a component) may support load balancing, using any of a variety of applicable load balancing techniques. For example, in some embodiments, leader node 420 may include a load balancing component (not shown).

Note that in at least some embodiments, query processing capability may be separated from compute nodes, and thus in some embodiments, additional components may be implemented for processing queries. Additionally, it may be that in some embodiments, no one node in processing cluster 400 is a leader node as illustrated in FIG. 4, but rather different nodes of the nodes in processing cluster 400 may act as a leader node or otherwise direct processing of queries to data stored in processing cluster 400. While nodes of processing cluster may be implemented on separate systems or devices, in at least some embodiments, some or all of processing cluster may be implemented as separate virtual nodes or instance on the same underlying hardware system (e.g., on a same server).

In at least some embodiments, processing cluster 400 may be implemented as part of a data warehouse service, as discussed above with regard to FIG. 3, or another data storage service(s) 220, and includes a leader node 420 and multiple compute nodes, such as compute nodes 430, 440, and 450. The leader node 420 may manage communications with clients, such as clients 250 discussed above with regard to FIG. 2. For example, leader node 420 may be a server that receives access requests from various client programs (e.g., applications) and/or subscribers (users), then parses them and develops an execution plan as part of query planning 425 (e.g., query plan(s)) to carry out the associated database operation(s)). More specifically, leader node 420 may develop the series of steps necessary to obtain results for complex queries and joins. Leader node 420 may also manage the communications among compute nodes 430 through 450 instructed to carry out database operations for data stored in the processing cluster 400. For example, compiled code may be distributed by leader node 420 to various ones of the compute nodes 430 to 450 to carry out the steps needed to perform queries, and intermediate results of those queries may be sent back to the leader node 420. Leader node 420 may receive data and query responses or results from compute nodes 430, 440, and 450. A database schema and/or other metadata information for the data stored among the compute nodes, such as the data tables stored in the cluster, may be managed and stored by leader node 420.

Processing cluster 400 may also include compute nodes, such as compute nodes 430, 440, and 450. These one or more compute nodes (sometimes referred to as compute nodes), may for example, be implemented on servers or other computing devices, such as those described below with regard to computer system 1000 in FIG. 8, and each may include individual query processing "slices" defined, for example, for each core of a server's multi-core processor. Compute nodes may perform processing of database operations, such as queries, inserts, deletions, updates, or other access requests, based on instructions sent to compute nodes 430, 440, and 450 from leader node 420. The instructions may, for example, be compiled code from execution plan segments and steps that are executable by the particular compute node to which it is sent. Compute nodes may send intermediate results from queries back to leader node 420 for final aggregation. Each compute node may be configured to access a certain memory and disk space in order to process a portion of the workload for a query (or other database operation) that is sent to one or more of the compute nodes 430, 440 or 450. Thus, compute node 430, for example, may access disk 431, 432, up until disk 438.

Disks, such as the disks 431 through 458 illustrated in FIG. 4, may be may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store columnar database tables through various column-oriented database schemes.

Compute nodes may implement a query engine, such as query engines 462, 464, and 466 for processing portions access requests received from leader node 420. For example, an access request, such as a query may be divided by leader node 420 in to multiple portions or streams. Each query portion or stream may be treated at a compute node as a separate access request for scheduling purposes. Compute nodes may also implement respective schedulers, such as schedulers 472, 474, and 476, for scheduling the execution of processes for performing access requests. In various embodiments, schedulers may be schedulers implemented as part of an operating system or other control software that provides a set of basic functionality to applications, like query engines, operating at a compute node.

Query engines may receive an access request (e.g., write, insert, update, modify, query, or query stream) from leader node 420 and perform prioritized scheduling. For example, a determination may be made as to whether capacity for prioritized processing of the access request exists. Capacity may not exist if another access request is already being processed with prioritized processing (or if multiple access requests are already being processed with prioritized processing such that all available prioritized processing slots are occupied). If capacity does not exist, then query engine 462 may direct the scheduler to reprioritize a currently executing access request (with prioritized processing) to make additional capacity. Whether or not capacity exists, query engine 462 may also direct that the newly received access request be executed with prioritized processing.

Figure 5A:
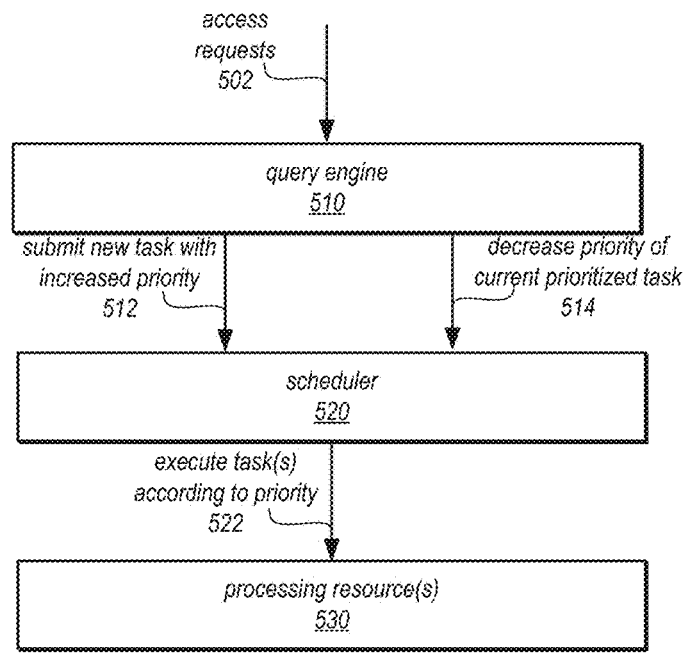
FIGS. 5A and 5B are block diagrams illustrating example techniques for scheduling access requests for prioritized processing, according to some embodiments.

FIG. 5A illustrates one example of a scheduling technique that a query engine and scheduler may implement, according to some embodiments. As new access requests are received 502 at query engine 510, query engine 510 may submit a new task or process with increase priority 512 to scheduler 520. For example, query engine 510 may leverage a priority value scheme implemented by scheduler 520 (e.g., where different priority values determine how much time and/or how quickly tasks are chosen for execution by scheduler 520). The new task submission 512 may include an assigned priority value that may give the new task a high priority (e.g., a high number, or low number, depending on the schema). This assigned priority value may be higher than any other priority numbers assigned to tasks executing on behalf of access requests that are not being processed with prioritized processing. For example, as indicated at 514, query engine 510 may also send an instruction to scheduler 520 to decrease the priority of a current prioritized task (e.g., to be a same priority as other tasks executing for access requests that are not being prioritized). In this way, query engine 500 may utilize the priority scheduling options provided by scheduler 520 to instruct scheduler 520 to execute task(s) for access requests 522 on processing resource(s) 530 according to the assigned priority.

Figure 5B:
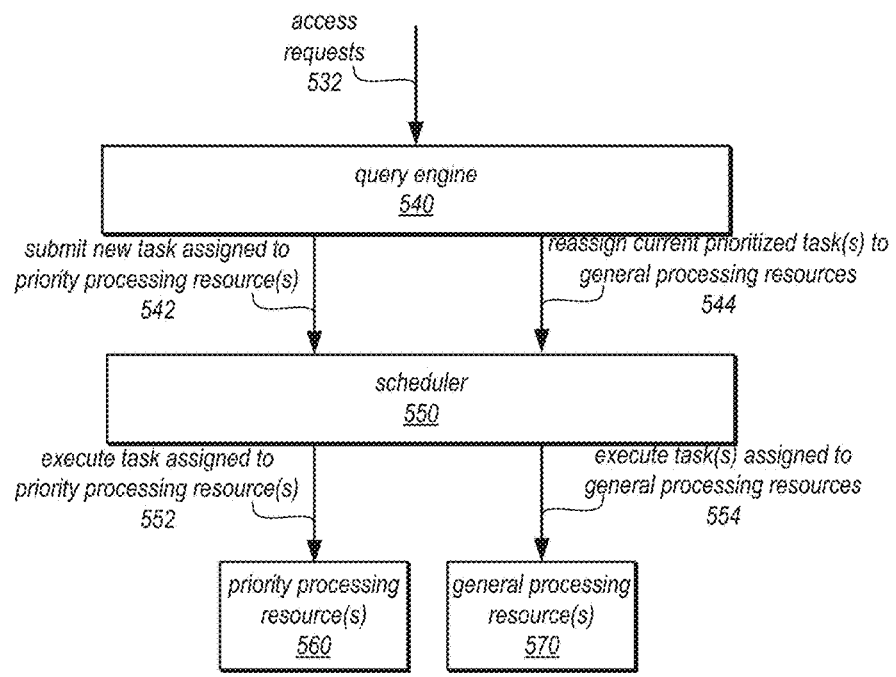

FIG. 5B illustrates another example of a scheduling technique that a query engine and scheduler may implement according to some embodiments. Instead of leveraging the same processing resources for executing all tasks, some processing resources may be designated for priority processing 560 and other processing resources may be designated for general processing 570. Such affinity scheduling techniques may allow query engine to assign prioritized tasks to priority processing resource(s) 560 (which may provide faster performance as a limited number of access requests may be executed as priority at any one time). For example, as new access requests are received 532 at query engine 540, query engine 540 may submit a new task assigned to priority processing resource(s) 542 to scheduler 550. Thus when selecting a next task to execute 552 on priority processing resource(s) 560, scheduler 550 may only choose from those tasks assigned to priority processing resource(s) 560 by query engine 540. Likewise, in order to reprioritize currently prioritized access requests, query engine 540 may submit a request to reassign current prioritized task(s) to general processing resource(s) 544. In this way, when selecting a next task to execute 554 on general processing resource(s) 570, scheduler 550 may only choose from those tasks assigned to general processing resource(s) 570 by query engine 540.

Please note that the previous examples of scheduling, rescheduling, prioritizing, reprioritizing or otherwise modifying the execution of tasks for access requests identified for priority processing are not intended to be limiting, but are merely provided as examples of scheduling techniques that may be utilized to ensure that access requests identified for prioritized processing receive a greater utilization of processing resources than those access requests identified for general processing. Other scheduling techniques may be implemented.

Turning back to FIG. 4, in some embodiments, each of the compute nodes in a processing cluster may implement a set of processes running on the node server's (or other computing device's) operating system that manage communication with the leader node, e.g., to receive commands, send back data, and route compiled code to individual query processes (e.g., for each core or slice on the node) in order to execute a given query. In some embodiments, each of compute nodes includes metadata for the blocks stored on the node. In at least some embodiments this block metadata may be aggregated together into a superblock data structure, which is a data structure (e.g., an array of data) whose entries store information (e.g., metadata about each of the portions of data (e.g., data blocks) stored on that node (i.e., one entry per data block). In some embodiments, each entry of the superblock data structure includes a unique ID for a respective portion of data (e.g., block), and that unique ID may be used to perform various operations associated with the portion of data. In at least some embodiments, an entry in the superblock may be maintained that indicates the range, such as the min and max values, for sort order values associated with the items stored in the portion of data and described in the superblock.

Figure 6:
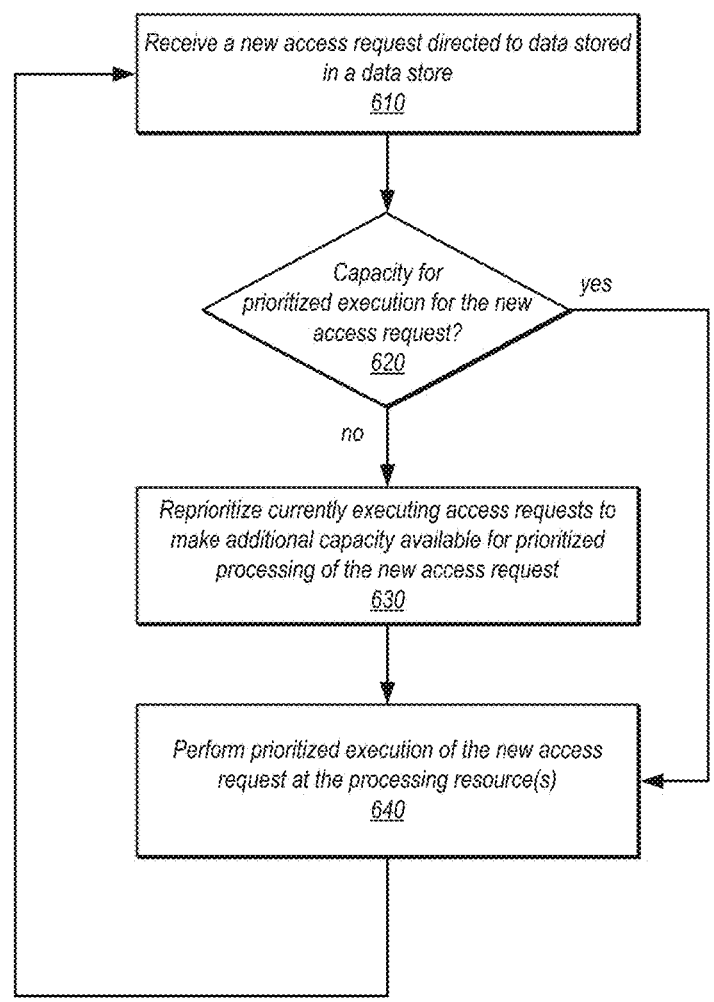
FIG. 6 is a high-level flowchart illustrating methods and techniques to implement prioritized scheduling of data store access requests, according to some embodiments.

Although FIGS. 2-5B have been described and illustrated in the context of a data storage service, like a data warehousing system implementing a columnar relational database table, the various components illustrated and described in FIGS. 2-5B may be easily applied to other data storage systems that provide data processing on behalf of clients. As such, FIGS. 2-5B are not intended to be limiting as to other embodiments of a storage engine, query engine, processing cluster, or other component that may implement prioritized processing for data store access requests. FIG. 6 is a high-level flowchart illustrating methods and techniques to implement prioritized scheduling of data store access requests, according to some embodiments. Various different systems and devices may implement the various methods and techniques described below, either singly or working together. For example, a processing cluster, such as described above with regard to FIGS. 3-4 may be configured to implement the various methods. Alternatively, a combination of different systems and devices may implement the described techniques. Therefore, the above examples and or any other systems or devices referenced as performing the illustrated method, are not intended to be limiting as to other different components, modules, systems, or configurations of systems and devices.

As indicated at 610, a new access request may be received that is directed to data stored in a data store. The access request may be one of various kinds of access requests to read, get, query, obtain, update, insert, change, or otherwise modify data in the data store. In at least some embodiments, the processing time or workload to complete the request may be unknown such that all scheduling decisions for the access request may be made agnostic with respect to the amount of time/work to complete (or remaining) for the access request. Some access requests may be a portion of a larger access request (e.g., a query stream of a query) and may be treated as separate access request for scheduling purposes.

As indicated at 620, a determination may be made as to whether capacity for prioritized execution for the access request exists at one or more processing resources. For example, in some embodiments, a number of slots (e.g., one or more) may be made available for prioritized processing). The number of slots may be configured by a client or by a query engine (e.g., based on historical execution metrics that allow prioritized access requests to receive a certain throughput relative to non-prioritized requests. If, for instance, the average throughput for 3 prioritized access requests (e.g., 3 slots) is not greater than 50% more than the average throughput for non-prioritized access requests, then the number of slots may be reduced to 2. Capacity, may also be determined based on other workload for processing resources (e.g., utilization to execute non-access requests, such as operating system processes or other application tasks). Therefore, capacity for prioritized processing may change but may allow for at minimum 1 access request for prioritized processing.

If insufficient capacity exists, as indicated by the negative exit from 620, one or more currently executing access requests may be reprioritized to make additional capacity available for prioritized processing of the new access request, as indicated at 630. For example, priority values may be assigned to the currently executing processing that decrease the priority of the access requests, as discussed above with regard to FIG. 5A, or the processing resource assignments or bindings may be modified to change the currently executing tasks from processing resources for prioritized processing to processing resources for general processing, as discussed above with regard to FIG. 5B.

Whether or not sufficient capacity exists, prioritized execution of the new access request may be directed at the processing resources, as indicated 640. Thus, a task or process for the new access request with a priority value indicating high priority (compared to the priority values of access requests executing with general processing), in some embodiments. In other embodiments, a task or process may be submitted that is assigned to processing resources dedicated to executing processes for prioritized access requests.

In some embodiments, a time out threshold may be implemented for access requests that are prioritized. If, for instance, an access request that is prioritized does not complete before the expiration of the time out threshold (e.g., 2 seconds), then the time out may be expired or threshold exceeded. The access request may then be reprioritized, as discussed above at element 630, to have decreased priority (e.g., being processed similar to other non-prioritized access requests). In this way, for prioritized processing that shares processing resources with non-prioritized resources, access requests with high workloads or long running access requests may not be prioritized over any other request that may also be long running or have a high workload.

In some embodiments, if no access request is prioritized (e.g., due to completion of an access request) or if a prioritized processing slot becomes available and is not filled, then the most recently reprioritized request may be promoted back to prioritized processing (or another request that is identified according to an order in which access requests are received). In this way, if several short or low workload requests are submitted concurrently, then other short running requests evicted by later received access requests may return to prioritized processing.

Figure 7:
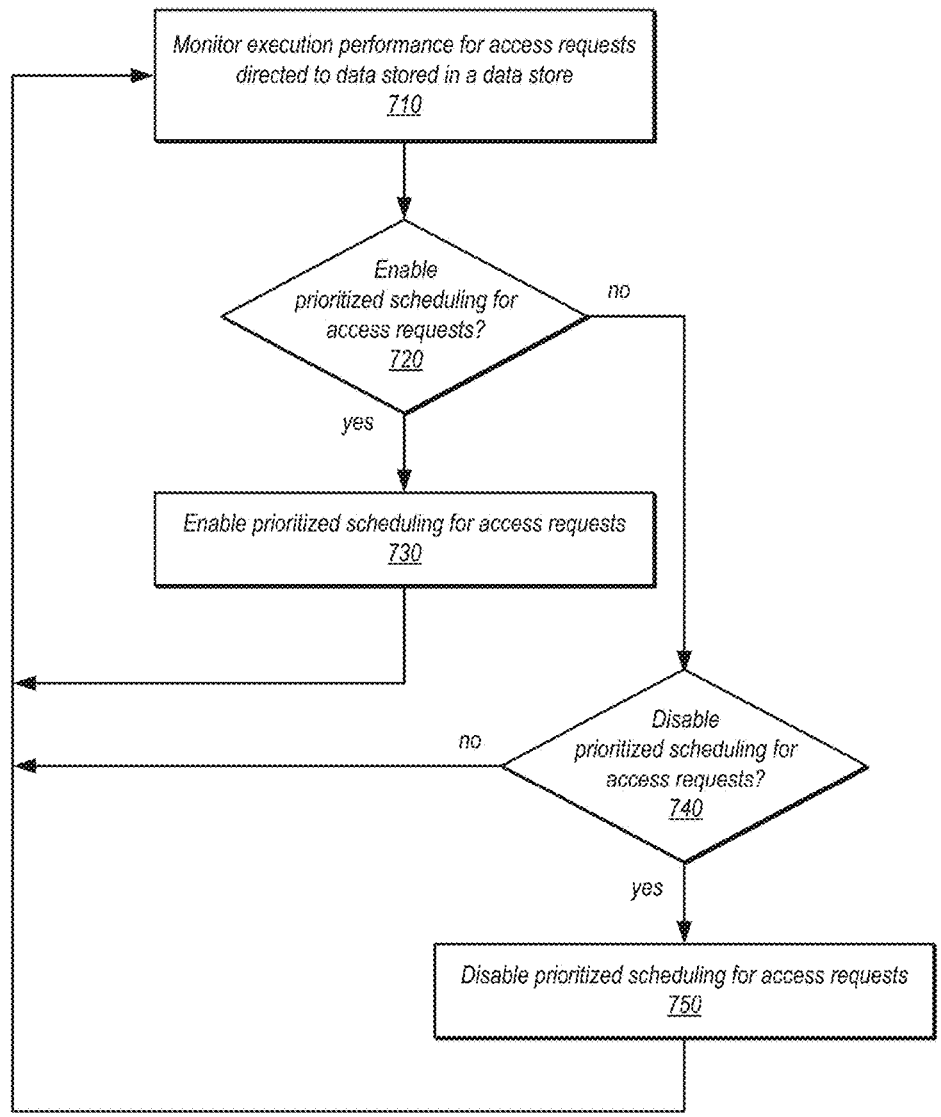
FIG. 7 is a high-level flowchart illustrating methods and techniques to automatically enable or disable prioritized scheduling, according to some embodiments.

Prioritized processing may provide optimized processing of access requests with varied workload or runtime. However, in some cases similar access requests may have better performance utilizing general scheduling techniques that are balanced among multiple requests without prioritizing any one request. Consider that in the day time, access requests to a data store may receive a variety of different requests from different users, but at night only long running batch processing access requests may be submitted. Switching form prioritized processing to general processing may offer more optimal performance during the night, whereas enabling prioritized scheduling may offer better performance during the day time. In some embodiments, a client may send a request to enable or disable prioritized scheduling. However, FIG. 7 is a high-level flowchart illustrating methods and techniques to automatically enable or disable prioritized scheduling, according to some embodiments.

As indicated at 710, execution performance for access requests directed to data stored in a data store may be monitored. For example, the processing time or latency for requests may be tracked (e.g., as a rolling average or raw values). If the processing time indicates wide variance in processing times, then as indicated at 720, an event to enable prioritized scheduling may be detected for access requests. The conditions or criteria may be determined based on a statistical analysis of historical execution metrics. Machine learning, for example, may be implemented to determine which metrics are indicative of a change from variable workloads to stead workloads for requests. Conditions or criteria that trigger enabling events may thus be determined based on the analysis. For example, historical analysis may identify that the change from daytime to night (as discussed in the example above) correlates with a change in access request variance, and thus may set a condition based on time for enabling prioritized scheduling. If an enabling event is detected, then as indicated at 730, prioritized scheduling may be enabled for subsequently received access requests. However, if a disabling event, as indicated at 740, is detected, then as indicated at 750, prioritized processing for scheduling access requests may be disabled (e.g., by assigning every request for general processing).

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of prioritized scheduling for data store access requests as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 8:
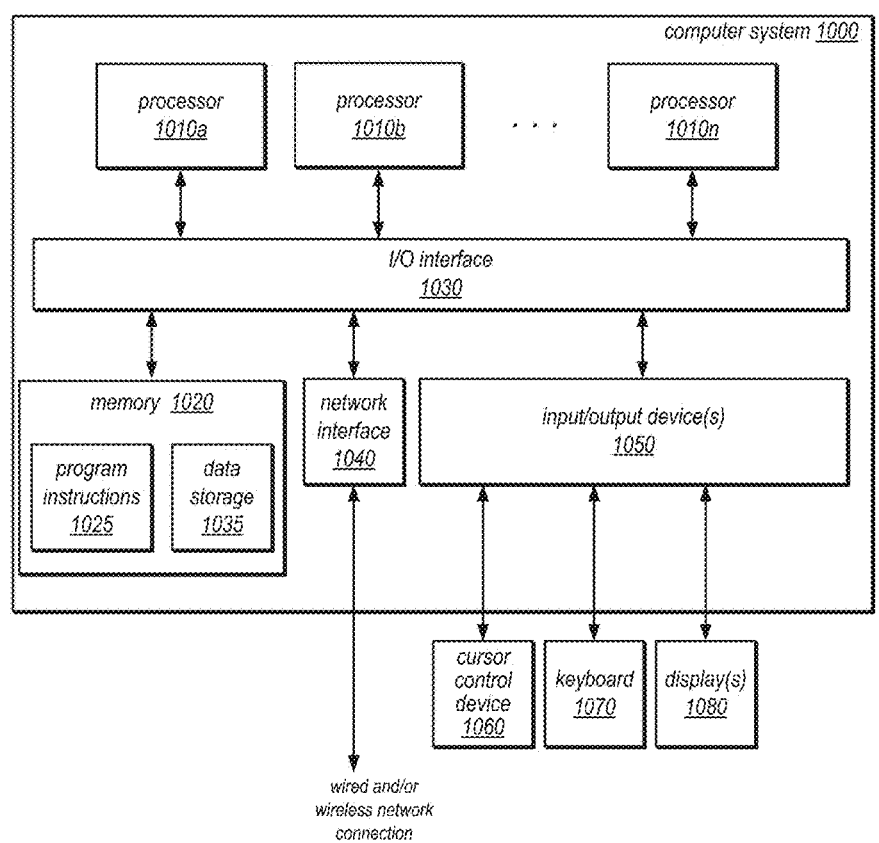
FIG. 8 illustrates an example system configured to implement the various methods, techniques, and systems described herein, according to some embodiments.

As shown in FIG. 8, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more storage devices that store data as part of a data store;
   at least one processor; and
   a memory that maintains program instructions that when executed by the at least one processor cause the at least one processor to implement a query engine and a scheduler;
   the query engine, configured to:
      receive a new access request directed to at least some of the data;
      in response to the receipt of the new access request:
         direct the scheduler to change a first priority to reprioritize one or more currently executing access requests at the at least one processor to make capacity at the least one processor available for prioritized processing of the new access request; and
         direct the scheduler to provide a second priority for the new access request to prioritize execution of the new access request at the at least one processor.

2. The system of claim 1,
   wherein to direct the scheduler to change the first priority to reprioritize the one or more currently executing access requests at the at least one processor, the query engine is configured to submit a request to reassign a respective priority value to the one or more currently executing access requests that decreases priority for executing the one or more currently executing access requests; and
   wherein to direct the scheduler to provide a second priority for the new access request to prioritize execution of the new access request, the query engine is configured to request execution of the new access request with a priority value that increases priority for executing the new access request greater than the decreased priority for executing the one or more currently executing access requests.

3. The system of claim 1, wherein the query processing engine is further configured to:
   prior to the receipt of the new access request:
      monitor one or more execution performance metrics for a plurality of previously executed access requests to determine that prioritized scheduling of access requests should be enabled; and
      in response to the determination that prioritized scheduling of access requests should be enabled, enable prioritized scheduling of subsequently received access requests at the query engine, including the new access request.

4. The system of claim 1, wherein the system is implemented as part of a network-based data storage service, wherein the new access request is received from a client of the network-based data storage service via a network-based interface for the data storage service, and wherein the one or more currently executing access requests are received via the network-based interface from one or more other clients of the network-based data storage service.

5. A method, comprising:
   performing, by one or more computing devices:
      receiving a new access request directed to data stored in a data store;
      in response to receiving the new access request:
         determining that a capacity of one or more processing resources for prioritized execution of the new access request is insufficient based, at least in part, on one or more currently executing access requests at the one or more processing resources;

in response to determining that the capacity of one or more processing resources for prioritized execution of the new access request is insufficient, changing a priority to reprioritize at least one of the one currently executing access requests to make additional capacity available for prioritized processing of the new access request; and performing prioritized execution of the new access request at the one or more processing resources based, at least in part, on the additional capacity for prioritized processing.

6. The method of claim 5, wherein changing a priority to reprioritize at least one of the one currently executing access requests to make additional capacity available for prioritized processing of the new access request comprises reassigning the at least one executing access request from a processing resource for prioritized execution to a different processing resource that is not utilized for prioritized execution; and wherein performing prioritized execution of the new access request at the one or more processing resources comprises assigning the new access request to the processing resource for prioritized execution.

7. The method of claim 5, wherein changing a priority to reprioritize at least one of the one currently executing access requests to make additional capacity available for prioritized processing of the new access request comprises reassigning a respective priority value for the one or more currently executing access requests that decreases priority for executing the one or more currently executing access requests; and wherein performing prioritized execution of the new access request at the one or more processing resources comprises assigning the new access request a priority value that increases priority for executing the new access request greater than the decreased priority for executing the one or more currently executing access requests.

8. The method of claim 5, further comprising:

in response to determining that a priority expiration time limit for prioritized execution of the new access request has expired, reprioritizing the new access request such that prioritized execution is not performed for the new access request.

9. The method of claim 5, further comprising:

prior to receiving the new access request:

monitoring one or more execution performance metrics for a plurality of previously executed access requests to determine that prioritized scheduling of access requests should be enabled; and in response to the determination that prioritized scheduling of access requests should be enabled, enabling prioritized scheduling of subsequently received access requests, including the new access request.

10. The method of claim 5, further comprising:

receiving a different access request directed to data stored in a data store;

in response to receiving the different access request, performing prioritized execution of the different access request along with the new access request at the one or more processing resources.

11. The method of claim 5, further comprising: upon completing execution of the new access request, reprioritizing the at least one currently executing access request for prioritized execution at the one or more processing resources.

12. The method of claim 5, wherein the new access request is a query, wherein execution of the query comprises execution of a plurality of query streams, and wherein performing prioritized execution of the new access request performs prioritized execution of at least one of the plurality of query streams.

13. The method of claim 5, wherein the one or more processing resources are implemented at a plurality of processing nodes in a data processing cluster, wherein prioritized execution of the new access request is performed at individual ones of the plurality of processing nodes.

14. A non-transitory, computer-readable storage medium, storing program instructions that when executed by one or more computing devices cause the one or more computing devices to implement:

receiving a new access request directed to data stored in a data store;

in response to receiving the new access request:

determining that a capacity of one or more processors for prioritized execution of the new access request is insufficient based, at least in part, on one or more currently executing access requests at the one or more processors;

in response to determining that the capacity of one or more processing resources for prioritized execution of the new access request is insufficient, changing a priority to modify scheduling of at least one of the one currently executing access requests to make additional capacity available for prioritized processing of the new access request; and scheduling the new access request for prioritized execution at the one or more processors based, at least in part, on the additional capacity for prioritized processing.

15. The non-transitory, computer-readable storage medium of claim 14, wherein the program instructions cause the one or more computing devices to further implement:

in response to determining that a priority expiration time limit for prioritized execution of the new access request has expired:

modifying scheduling of the new access request such that prioritized execution is not performed for the new access request; and modifying scheduling of the at least one of currently executing access request to return the at least at least one currently executing access request to prioritized execution.

16. The non-transitory, computer-readable storage medium of claim 14, upon completing execution of the new access request:

identifying one of the currently executing access request to schedule for prioritized execution according to an order in which the currently executing access requests were received for processing; and modifying scheduling of the identified currently executing access request for prioritized execution at the one or more processors.

17. The non-transitory, computer-readable storage medium of claim 14, wherein, in changing the priority to modify scheduling of the at least one of the one currently executing access requests to make additional capacity available for prioritized processing of the new access request, the program instructions cause the one or more computing devices to implement reassigning the at least one executing access request from a processing resource for prioritized execution to a different processing resource that is not utilized for prioritized execution; and wherein, in scheduling the new access request for prioritized execution at the one or more processors, the program instructions cause the one or more computing devices to implement assigning the new access request to the processing resource for prioritized execution.

18. The non-transitory, computer-readable storage medium of claim 14, wherein the program instructions cause the one or more computing devices to further implement:
prior to receiving the new access request:
receiving a request to enable prioritized scheduling of access requests; and
in response to the receiving the request to enable prioritized scheduling of access requests, enabling prioritized scheduling of subsequently received access requests, including the new access request.

19. The non-transitory, computer-readable storage medium of claim 14, wherein the program instructions cause the one or more computing devices to further implement:
monitoring one or more execution performance metrics generated based, at least in part, on the execution of the new access request and the one or more currently executing access requests to determine that prioritized scheduling of access requests should be disabled; and
in response to the determination that prioritized scheduling of access requests should be disabled, disabling prioritized scheduling of subsequently received access requests.

20. The non-transitory, computer-readable storage medium of claim 14, wherein the system is implemented as part of a network-based data storage service, wherein the new access request is received from a client of the network-based data storage service via a network-based interface for the data storage service, and wherein the one or more currently executing access requests are received via the network-based interface from one or more other clients of the network-based data storage service.

* * * * *